United States Patent [19]

Salmon

[11] Patent Number: 5,400,062
[45] Date of Patent: Mar. 21, 1995

[54] ELECTROSTATIC PRINTING APPARATUS AND METHOD

[76] Inventor: Peter C. Salmon, 70 Angela Dr., Los Altos, Calif. 94022

[21] Appl. No.: 932,897

[22] Filed: Aug. 19, 1992

[51] Int. Cl.$^6$ .............................................. B41J 2/06
[52] U.S. Cl. ......................................... 347/55; 347/6; 347/84
[58] Field of Search .............................. 346/154–159, 346/140 R; 355/202, 245, 326, 327; 347/1, 5–7, 9–11, 20, 21, 40, 44, 48, 50, 55, 84–87, 95

[56] References Cited

U.S. PATENT DOCUMENTS

| | | | |
|---|---|---|---|
| 4,717,926 | 1/1988 | Hotomi | 346/140 R |
| 4,731,622 | 3/1988 | Hicks et al. | 346/157 |
| 4,777,500 | 10/1988 | Salmon | 346/160.1 |
| 4,836,135 | 6/1989 | Kohyama et al. | 118/653 |
| 5,030,976 | 7/1991 | Salmon | 346/157 |
| 5,038,158 | 8/1991 | Ayers et al. | 346/153.1 |
| 5,144,340 | 9/1992 | Hotomi et al. | 346/140 R |
| 5,153,617 | 10/1992 | Salmon | 346/154 |

OTHER PUBLICATIONS

Hosoya et al., IEEE, 2207, 1485-1490 (1985), Xerographic Development using Single-component Non-magnetic Toner.

Takahashi, T., et al., *Photographic Science & Engineering*, vol. 26, No. 5, Sep./Oct. 1982, pp. 254-261, Mechanism of Canon Toner Projection Development.

*Primary Examiner*—A. T. Grimley
*Assistant Examiner*—T. A. Dang
*Attorney, Agent, or Firm*—Flehr, Hohbach, Test, Albritton & Herbert

[57] ABSTRACT

An electronic printing apparatus employs digitally controlled toner conveyors and writing head to print monocomponent toners on plain paper in a single pass. Integrated circuits and thin film transistors convert high level image information into toner controlling pulses. Pixel intensity is programmed by associating a counted number of packets of toner with each level of pixel depth.

30 Claims, 11 Drawing Sheets

ELECTROSTATIC PRINTING APPARATUS AND METHOD

BRIEF DESCRIPTION OF THE INVENTION

This invention relates to electrostatic printing and more particularly to digitally controlled apparatus and method for delivering monocomponent toners in color or black and white image configuration onto plain paper substrates.

BACKGROUND OF THE INVENTION

In electrophotography, the development process of attracting charged toner particles to a latent image on a photoreceptor surface is known. In the early 1980s Canon introduced a monocomponent development system based on insulating toner, magnetic transport, and a non-contact development referred to as jumping development. The toner particles jumped across the gap between a donor roll and a photoconductive drum using large (1200 V peak-peak) AC fields superimposed across the development zone, T. Takahashi et al, *Photogr. Sci. Eng.* 26, 254 (1982).

Subsequently, Toshiba also developed a noncontact jumping development method described in U.S. Pat. No. 4,836,135 issued to Kohyama et al, *Developing Apparatus Having One-Component Developing Agent.* In addition, Toshiba developed a toner charging apparatus similar to that used in the preferred embodiment of the present invention, see Hosoya et al, *IEEE-IAS Annu. Conf. Proc.* (1985) p. 1495.

The present invention relates to toner transport methods involving jumping or rolling of packets of toner from one electrode to another. As examples, the electrodes may be on a surface comprising a toner conveyor or on a surface comprising a writing head. The present invention thus has broad applicability to toner transport and imaging.

In an electrostatic printing device, toner particles are moved by a force qE, the product of the particle charge and the local electric field. If the electric field is too large, air breakdown will occur. The field value at which breakdown occurs is quite strongly dependent on the gap between electrodes. The maximum usable field while avoiding field emission is around 70 volts per micron when the electrode gap is around 5 microns. (See R. M. Schaffert, *Electrophotography*, 2nd edition, p 518 for a graph entitled Modified Paschen Curve.) To create a fast printing device it is advantageous to use the highest possible electric fields, because higher fields will accelerate the particles to higher velocities. Properly directed, higher particle velocities will translate into faster printing machines. If control electrodes are used to move the toner, then the optimum gap between the electrodes is around $5\mu$. Fortunately, modern photolithographic techniques are available to create conductive patterns approaching $5\mu$ line width and space on large substrates, including rigid and flexible media.

Existing electrophotographic processes have treated toner as a continuous medium which is imaged in bulk. By contrast, the apparatus of the current invention controls and directs individual toner particles or toner packets for an extremely high degree of control over the printed image. This microscopic level of control would normally be expected to result in a very slow printing process. However, high speed is made possible and practical by the application of large scale integrated circuits (ICs) and active thin film transistor circuits (TFTs) that convert high level image information into toner controlling voltages. An example of the speed advantage in the preferred printing embodiment is that 2400 pixels are imaged in parallel to produce a new pixel line which spans the width of a page. A digital processor is provided for each pixel to be printed. As will be described, the digital processor converts 24 bit pixel words into serial bit streams that independently control the amount of toner delivered at each pixel site on the paper. Thus process complexity has been shifted from electromechanical to electronic. By virtue of the logic power and speed available in ICs and TFTs, the twin goals of high performance and low manufacturing cost can be simultaneously realized.

The preferred toner in the current invention is monocomponent, non-magnetic, and non-conducting. It has a mean diameter of around $5\mu$ which matches the optimum electrode width and spacing of $5\mu$, and avoids the effects of van der Waals forces which can dominate the qE force at smaller toner diameters. Preferably, the toner formulation results in resilient particles which do not fracture on collision; thus avoiding toner fragments or "fines" at very small sizes. In addition, the preferred toner shape is spherical rather than irregular; this enables rolling transport mechanisms for particles moving on a surface.

The author's co-pending applications, Ser. No. 07/658,397 filed Feb. 20, 1991 and Ser. No. 07/842,004 filed Feb. 25 1992 are incorporated herein by reference. They describe digital imaging methods based on moving packets of toner from electrode to electrode. The present invention includes rolling of spheridized toner particles to achieve toner transport with less energy applied. The present invention also includes the use of TFTs in the preferred embodiment for cost effective implementations of the writing head.

OBJECTS AND SUMMARY OF THE INVENTION

It is an object of the present invention to provide a printing apparatus and method for printing a color or black and white image on plain paper or transparent substrates at high speed, using simple parts and processes.

It is a further object to provide an electronic printing apparatus and method which can modulate the depth of toner in each pixel position with high accuracy and at high speed, resulting in a continuous tone image.

It is a further object of the invention to provide an electronic apparatus and method for printing a full color image with a single pass of the receiving sheet past a single writing head, thus simplifying the printing process compared with printing methods that require four-color separations or multiple writing heads to achieve a full range of colors.

It is a further object to provide a digitally controlled imaging apparatus which offers both high speed and precision at low cost, for example by performing digital imaging algorithms with large scale integrated circuits and thin film transistors.

It is another object of the invention to provide a print engine which is compact in size, light in weight, and quiet in operation.

A further object of the invention is to provide a print engine that supports the flexibility of printing color images interspersed with black and white images with no operator action other than issuing print commands.

A further object of the invention is to support copy engines as well as print engines; the copy engines would require a scanner or other device to convert optical images into digital data.

The foregoing and other objects of the invention are achieved by an electronic printing apparatus that is digitally controlled. For each color to be printed the apparatus includes a toner reservoir, a toner charging assembly, a toner loading assembly, and a toner conveyor. The preferred embodiment employs four process colors: cyan, yellow, magenta, and black. The apparatus also includes one each writing head, corona charging device, and fixing assembly. Toner feeds from each of the reservoirs into charging assemblies wherein friction is applied to impart a triboelectric charge on the toner particles using methods known in the art. The objective of each of the charging assemblies is to produce a monolayer of well charged toner on a donor roll. The toner conveyors have elongated conveyor electrodes that extend the full printing width of the receiving sheet and are closely spaced, as close as 5 microns apart, so that voltages of the order of 20 volts applied to the electrodes will be effective in rolling toner from one electrode to the next. The conveyor electrodes are driven by a three phase digital clock that can be started, stopped, paused or reversed, depending on the desired motion of toner packets moving over the surface of the toner conveyor. Each toner conveyor is loaded with toner which is moved electronically, by the application of a single programmable three phase clock, until fresh toner is presented to the writing head. The toner conveyors together with the toner loading methods of the present invention have the desirable quality that only those particles having an acceptable charge and mass are conveyed; this prevents undesirable particles from reaching the imaging region. Toner unused in the writing process is returned to the appropriate toner reservoir for recycling. In the preferred embodiment, the writing head includes multiple linear arrays of electrodes; each linear array forming a column corresponding to a pixel site to be printed. Each electrode is connected to one bit of memory that stores a portion of the pattern to be imaged. After the memory elements have all been written, effectively conditioning the imaging array, a write cycle images a full pixel line on to a writing head with a single write pulse in the preferred embodiment. As will be described, this single pulse simultaneously writes all of the colors, including all of the pixel depths required to support 24 bit color. After the color image has been written to the writing head, the packets of imaged toner are stepped to a transfer edge of the writing head. Stepping of the packets is accomplished by clocking serial shift registers provided for each pixel location, as will be described. Toner packets step to the transfer edge, then continue across a transfer gap between the writing head and the paper, attracted by the transfer charge applied to the back side of the paper by a corona charging device. The method of corona charging the back side of the paper, and subsequent transfer of the insulating toner particles to the paper is known in the art. In the preferred embodiment, a write packet is sized to provide one 64th of the quantity of toner required to saturate the target pixel site with toner of that color. Sixty-four levels of toner of each of four colors are required to implement a color hardcopy with 24 bit color, comprising 16.7 million possible color combinations at each pixel location. After a print cycle is completed, the receiving sheet is stepped by one pixel position, and is then ready to image the next line of pixels. By alternating print cycles and paper steps, a two dimensional image is created on the receiving sheet. The imaged toner on the receiving sheet is transported through a fuser comprising a pair of rollers that apply pressure and heat to fix the image, as is known in the art. After a full page has been imaged and fused the receiving sheet is ejected from the marking engine, similarly to existing laser print engines and copy engines.

The present invention is a color printing apparatus for printing on an image receiving member comprising: multiple sources of toner particles; multiple toner charging means; multiple toner loading means; multiple particle conveyor means that convey toner particles from loading points adjacent the charging means to imaging regions adjacent a writing head; means to attract particles from the conveyors to write electrodes on the writing head; means to step toner particles attracted to the write electrodes to a transfer edge of the writing head: means for presenting the image receiving member to the writing head; means to transfer particles from the transfer edge to corresponding pixel sites on the image receiving member; and means for applying and controlling voltages to the loading means, the conveyor means, and the write electrodes to deliver a predetermined amount of toner to each of said corresponding pixel sites on the image receiving member.

An alternative embodiment of the invention for printing monochrome images on an image receiving member comprises a single source of charged toner particles; a toner loading means; means to attract particles from the toner source to write electrodes on a writing head; means to step toner particles attracted to the write electrodes to a transfer edge of the writing head; means for presenting the image receiving member to the writing head; means to transfer particles from the transfer edge to corresponding pixel sites on the image receiving member; and means for applying and controlling voltages to the loading means and the write electrodes to deliver a predetermined amount of toner to each of said corresponding pixel sites on the image receiving member.

BRIEF DESCRIPTION OF THE DRAWINGS

The invention will be understood from the descriptions to follow when read in connection with the accompanying drawings of which.

DETAILED DESCRIPTION OF THE PREFERRED EMBODIMENT

Figure 1:
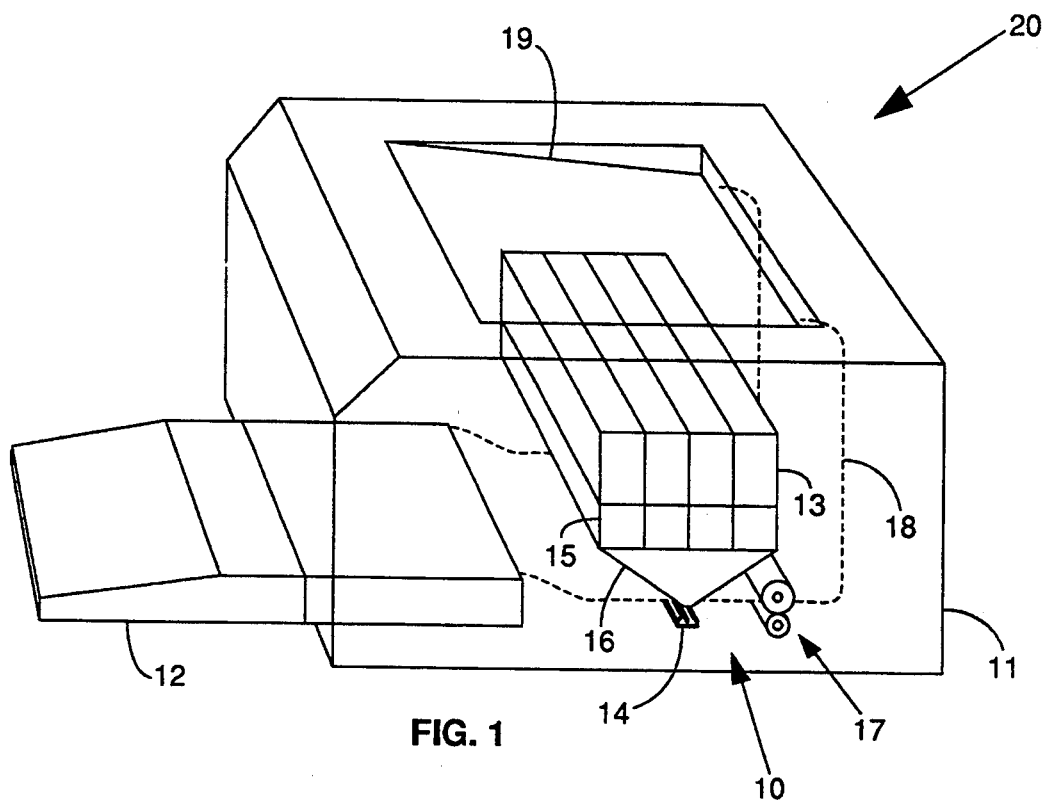
FIG. 1 is a perspective view of a four color desktop printer in accordance with the present invention.

FIG. 1 shows a print engine 10 incorporating the invention enclosed within a desktop printer 20. In addition to the print engine, printer 20 includes an enclosure 11, paper input tray 12, and toner reservoirs 13. Printer elements not shown in the figure include paper transport mechanisms, human interface controls and displays, a system controller board, input/output connections, and power supplies. Print engine 10 includes a corona charging device 14, toner charging assemblies 15, toner imaging assembly 16, and fixing assembly 17. Paper follows a simple path 18 through the printer. A receiving sheet feeds from paper input tray 12 past corona charging device 14 and imaging assembly 16, through fixing assembly 17, and is ejected into output tray 19. Note that there are no optical writing elements and no photoreceptor as in electrophotographic machines. The only parts that move in a printer employing the present invention are toner charging assembly components and paper transport components. This simplification of mechanical hardware compared to existing machines leads to improved printer reliability as well as small size and weight.

Figure 2:
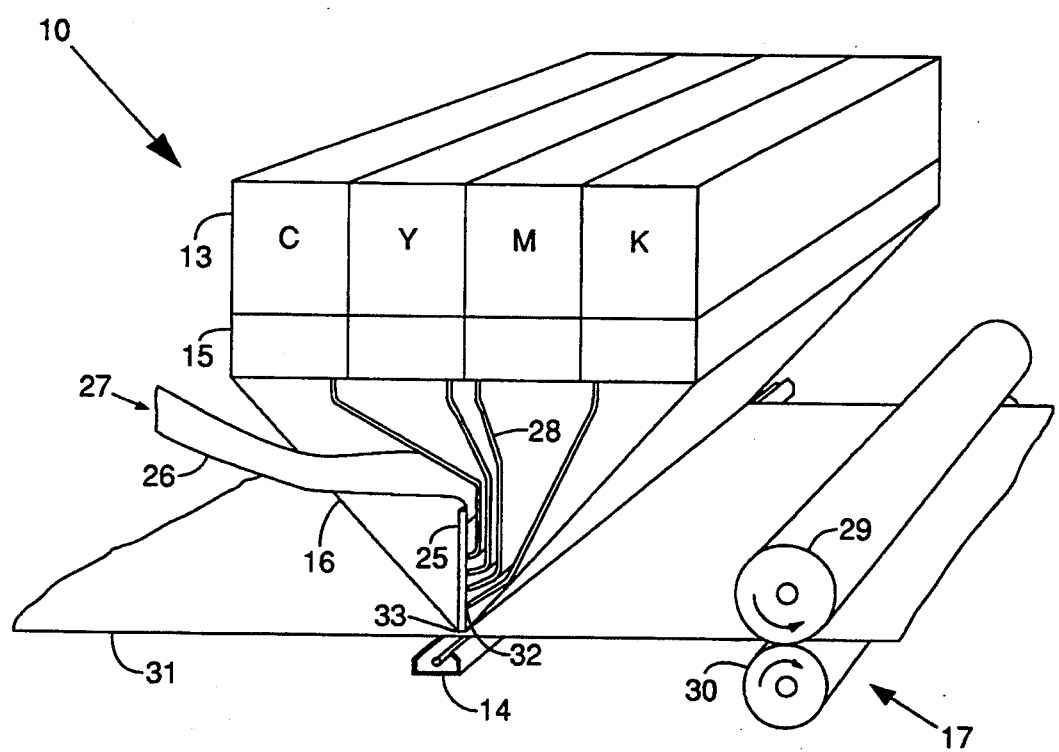
FIG. 2 is a perspective of a four color print engine in accordance with the present invention.

FIG. 2 is an expanded view of the print engine 10 of FIG. 1 showing more detail of the print engine. Toner reservoirs 13 contain four toner colors in the preferred embodiment: cyan (C), yellow (Y), magenta (M), and black (K). Toner imaging assembly 16 includes a writing head 25 connected via a ribbon cable 26 to an information source which provides high level print and control data 27. A two-way toner conveyor 28 is provided between each toner charging assembly 15 and writing head 25. Fixing assembly 17 includes a fusing roller 29 and a backup roller 30. In the preferred embodiment, print engine 10 extends across the full width of receiving sheet 31. In operation, each toner conveyor 28 feeds fresh toner past writing head 25 at imaging regions 32 and returns unused toner to a reservoir 13, as will be further described. A two-dimensional array of write electrodes is provided on writing head 25 opposite imaging regions 32 of toner conveyors 28. As will be described, control voltages are selectively applied to the write electrodes to attract toner in discrete packets, the number of packets attracted corresponding to the pixel depth required at each pixel site. After the required amounts of toner have been written to the write electrodes, a shifting process is employed to step the toner packets to transfer edge 33 of writing head 25. Toner packets are stepped off of transfer edge 33 to receiving sheet 31, attracted by a transfer charge applied to the backside of sheet 31 by corona charging device 14.

Figure 3:
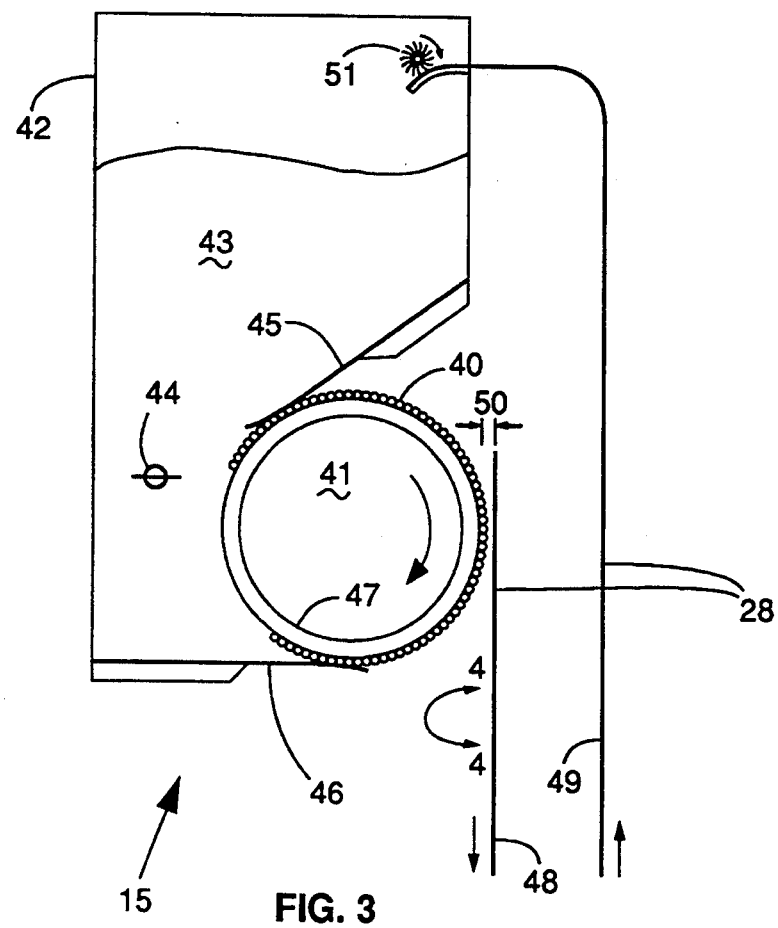
FIG. 3 is a cross-sectional schematic view of a toner charging assembly known in the art, shown in relation to a two way toner conveyor of the present invention.

Operation of the charging assemblies will now be described. It is known in the art how to supply a monolayer of charged toner on a supporting surface, see for example Hosoya et al, *IEEE-IAS Annu. Conf. Proc.* (1985) p. 1495. FIG. 3 includes a cross-sectional view of a representative charging assembly 15 wherein a charged monolayer of toner 40 is formed on the surface of a donor roll 41. Assembly 15 includes a reservoir 42 containing toner 43, a mixer 44, a regulating plate 45 and a recovering plate 46. Donor roll 41 has a metal sleeve 47 at the outer circumference for the purpose of applying a control voltage. FIG. 3 also shows the relationship between charging assembly 15 and a two-way toner conveyor 28 of the present invention. Conveyor 28 includes a refresh segment 48 and a return segment 49; the arrows indicate the direction of toner travel on each of the conveyor segments. There is a gap 50 of approximately 0.2 mm between the surface of donor roll 41 and conveyor electrodes on refresh segment 48. In operation, donor roll 41 rotates against regulating plate 45 which presses against the donor roll surface to simultaneously meter and charge the toner monolayer 40. In the preferred embodiment, toner particles are positively charged to approximately $10^{-14}$ coulombs. It will be described how a loading assembly loads toner from monolayer 40 to conveyor refresh segment 48, and a three phase clock steps toner around the toner conveyor in the directions shown. Depending on the color demands of the pixel currently being imaged, the write head may or may not pull toner off refresh segment 48 at the writing head. In any event, unused toner returns via return segment 49 of the conveyor to a position inside reservoir 42 where a rotating brush 51 or other means wipes returned toner off the return segment for recycling through the charging assembly.

Figure 4:
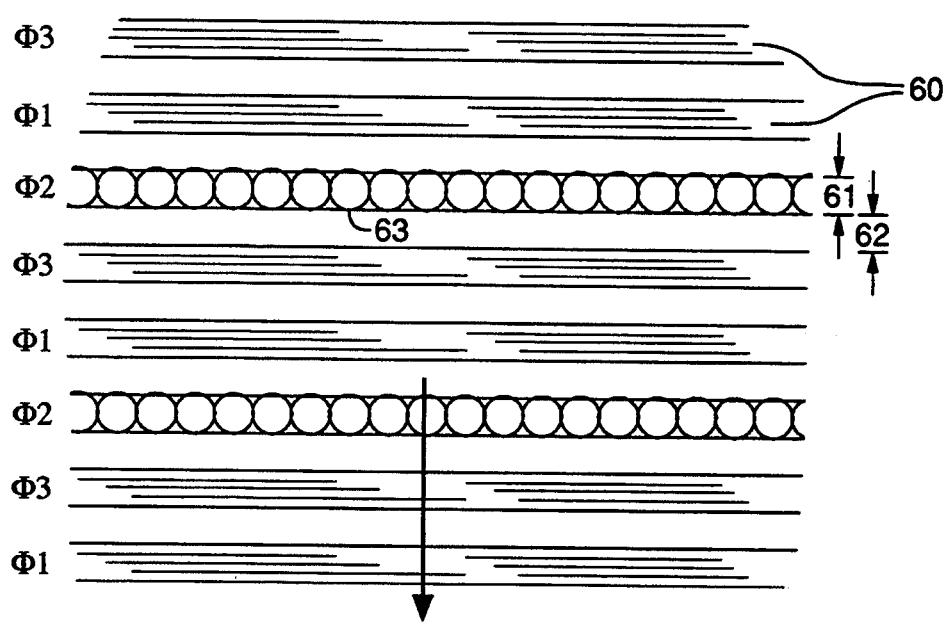
FIG. 4 is an enlarged fragmentary plan view of the portion 4—4 of FIG. 3.

FIG. 4 is a magnified fragmentary view of the portion 4—4 of FIG. 3. Elongated conveyor electrodes 60 extend the full width of the receiving sheet except for a margin at the edges, a width of 8 inches in the preferred embodiment. The conveyor surface may be coated with a thin insulating layer, The material properties of the conveyor surface must be carefully chosen for their triboelectric effect; i.e. friction between the charged toner particles and the conveyor surface may have an effect of charging or discharging the particles, over and above the charge intentionally applied in charging assembly 15. Appropriate materials have been developed for this purpose and are known in the art. Electrodes 60 are connected in repeating phase order to $\Phi1$, $\Phi2$, and $\Phi3$ as shown, which are the three phases of a programmable conveyor clock, to be described further in relation to FIG. 5. Electrode width 61 and space 62 are each approximately $5\mu$. Five microns is the optimal spacing to achieve the maximum electric field without air breakdown as described previously. At any instant in time one of the three phases is active, attracting toner particles, and the other two phases are inactive, repelling toner particles. Consequently, toner particles 63 adhere to every third electrode as shown. In the preferred embodiment, toner particles 63 are approximately spherical in shape, and have a mean diameter of approximately $5\mu$.

Figure 5A:
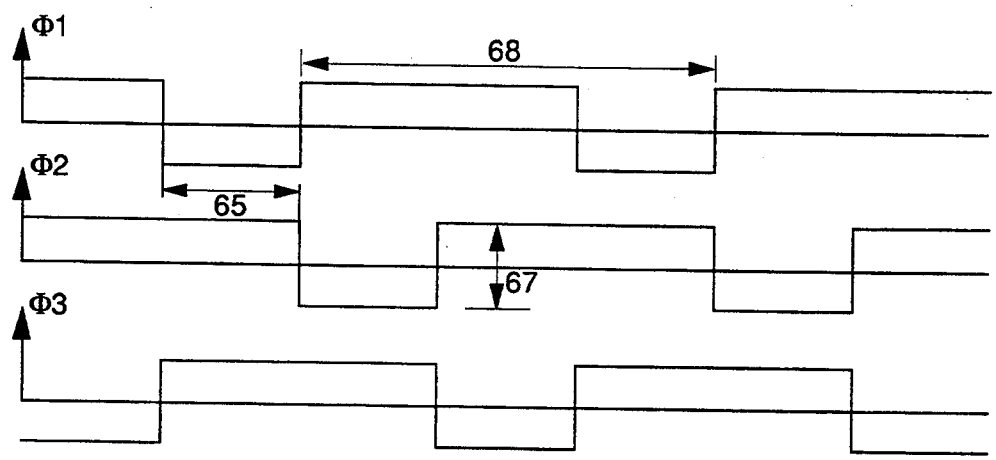
FIG. 5A shows a rectangular shaped three phase clock.
Figure 5B:
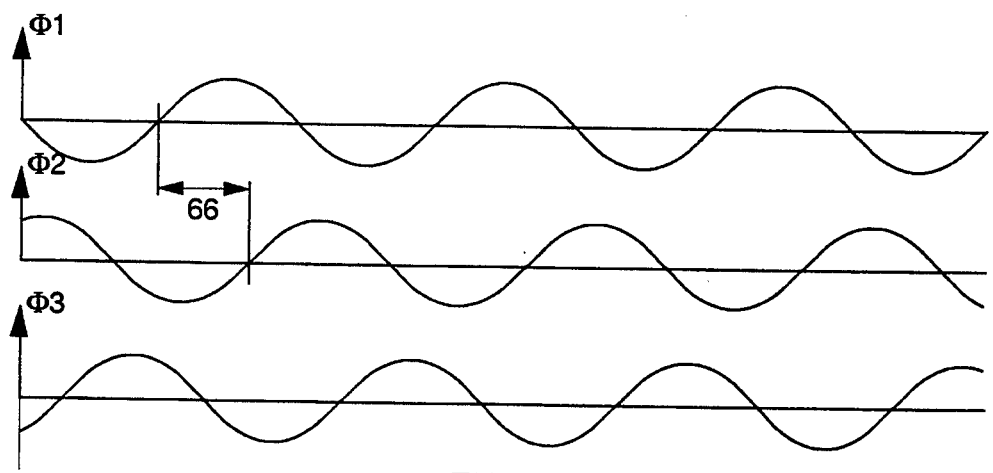
FIG. 5B shows a sinusoidal shaped three phase clock.
Figure 5C:
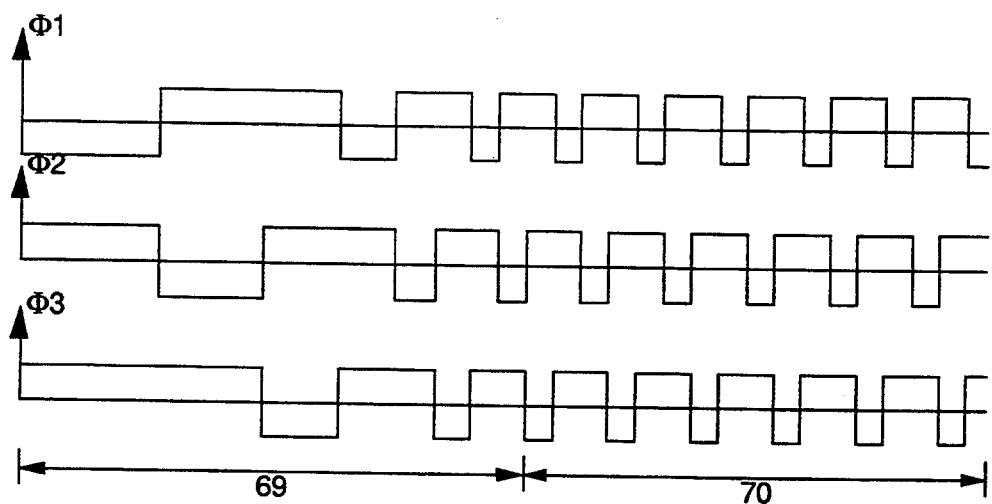
FIG. 5C shows an accelerating rectangular three phase clock.

FIG. 5 shows several alternative toner transport waveforms. FIG. 5A shows a rectangular waveform, FIG. 5B shows a sinusoidal waveform, and FIG. 5C shows an accelerating rectangular waveform. In each case a voltage travelling wave exists where the active phase (negative for positively charged particles) propagates from electrode to electrode, pulling toner particles with it. The delay 65 between phases in FIG. 5A is one third of a period, and a similar phase delay 66 is shown in FIG. 5B. Many different waveforms can effectively perform the transport function of the toner conveyor and the writing head, including variations between rectangular and sinusoidal. The most suitable waveform depends on multiple factors such as distributions of toner size, shape, and charge; required printing speed; toner transport method (jumping versus rolling), and available driver technology for the programmable clock generator that generates the waveform voltages. In the preferred embodiment of the present invention, the waveforms applied to the toner conveyor are rectangular as shown in FIG. 5A. As will be discussed in relation to the writing head, the preferred waveforms applied to the write electrodes will be rectangular and accelerating, as shown in FIG. 5C. For both the toner conveyor and the writing head, the preferred toner transport method is transport by rolling.

FIG. 5A shows the rectangular waveform applied to the toner conveyor. The peak to peak amplitude swing 67 is 20 V in the preferred embodiment, although it can be much lower and also much higher, for example as high as 250 V without exceeding the field limit of 70 V/$\mu$ at a $5\mu$ electrode spacing. The period 68 is a slow 10 microseconds in the preferred embodiment because it will be shown that this provides sufficient time for fresh toner to move into position opposite the writing head in accordance with the proposed print algorithm. The sinusoidal waveform of FIG. 5B provides smoother motion of the toner particles from electrode to electrode, but for a given amplitude, does not move the particles as fast as the rectangular waveform of FIG. 5A. In addition, the symmetry of the sinusoidal waveform creates travelling voltage waves for both positive and negative particles in the same direction. This means that any wrong sign toner mixed in with right sign toner will not be filtered out by a conveyor driven by symmetrical sinusoidal waveforms. The accelerating waveform of FIG. 5C has an interval 69 wherein the duration of the active phase gets shorter and shorter. During interval 69 the average velocity of a conveyed particle steadily increases. Interval 69 is followed by an interval 70 wherein the period is constant and the average particle velocity is also constant. The constant average velocity corresponding to period 70 is substantially higher than could be achieved without an accelerating waveform.

The rolling toner transport method, also referred to herein as the rolling model, will now be described. The waveforms of FIG. 5 create a potential well at the active electrodes which have a negative voltage applied to them. The potential well advances from electrode to electrode as the phases advance, conforming to the particular waveform applied. Particles starting from rest on an electrode are held by the local electric field and by image forces arising from their proximity to the underlying metal electrode. When the active phase switches to the adjacent electrode, the strong local electric field overcomes the particle inertia as well as rolling friction associated with the image force, and starts the particle rolling toward the active electrode. The angular velocity then increases until the particle arrives at the active electrode, where it is decelerated and held by the associated potential well until the process is repeated. If an accelerating waveform like that shown in FIG. 5C is used, particles do not decelerate to zero velocity in each well, but increase their speed from well to well until the waveform settles at a short constant period. If this same short period waveform were applied to particles at rest without an accelerating sequence, heavier particles would not fall into synchronism with the advancing potential wells because of their inertia. Typically, the heavier particles will become airborne, and may have sufficient velocity to escape from the conveyor's influence. Such escaping particles will generally contibute to image noise, and consequently are very undesirable.

The rectangular waveforms of FIG. 5 are drawn with no time overlap of the active phases. This is significant with respect to transport of particles with the wrong sign. Existing toner charging methods generally charge a small fraction of particles to a polarity opposite from the desired polarity. If the active phases overlap, some wrong sign particles will propagate along the conveyor with the right sign particles; if the phases do not overlap, wrong sign particles will not propagate and will tend to accumulate at the loading point of the conveyor. If wrong sign particles are propagated to the imaging region, they may contaminate white areas on the receiving sheet. To illustrate design flexibility in a digital apparatus of the present invention, a possible corrective measure is proposed i.e. periodically to reverse the polarities of the three phase clock to move the wrong sign particles off the conveyor, to be recycled through the toner charging assembly. This type of measure is made possible by programming the transitions and polarities of the three phase clock under software control. The fact that wrong sign toner can be prevented from reaching the vicinity of the writing head is one aspect of toner filtering associated with toner conveyors of the present invention. In a similar manner, by suitably combining waveshape, timing and amplitude of the three phase clock, it is possible to screen out unwanted toner sizes and inadequately charged right sign toner, essentially removing them from the imaging process and recycling them until more favorable particle parameters are achieved, or until they are discarded with a spent toner cartridge.

Figure 6:
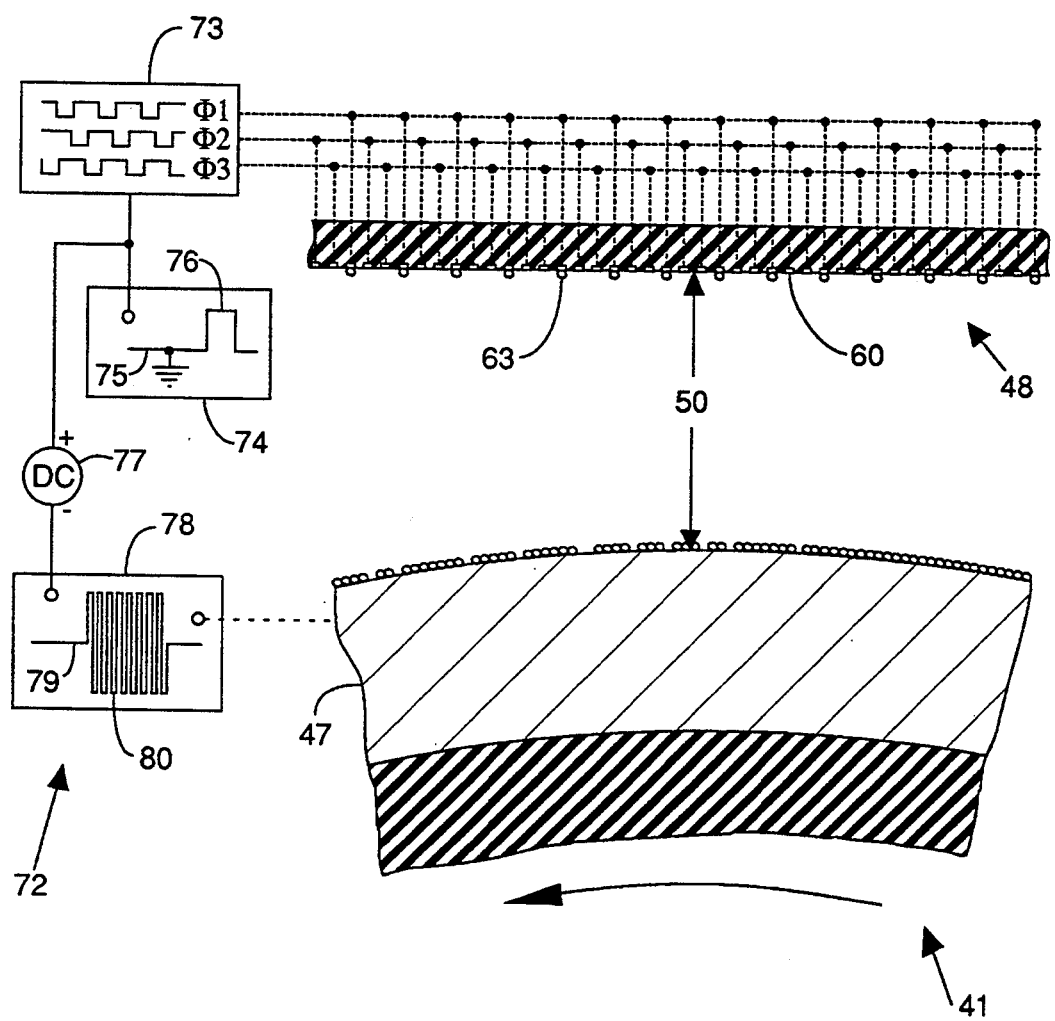
FIG. 6 is an enlarged fragmentary cross-sectional view describing loading of toner from a donor roll to a toner conveyor, and includes schematic descriptions of associated waveform generators.

Toner loading from a toner source to a toner conveyor will now be described. FIG. 6 is a schematic drawing of programmable waveforms used in the toner loading process, together with a cross-sectional view of the loading region between a donor roll 41 and a refresh segment 48 of a toner conveyor. Toner loading assembly 72 consists of: a three phase clock driver 73 applied to the electrodes of the toner conveyor; a pedestal driver 74 that switches the reference voltage of the three phase clock between ground 75 and dc value 76; a dc voltage 77 provided to retain the monolayer charge on sleeve 47 of donor roll 41 in the absence of an excitation voltage; and a switchable square wave excitation driver 78 that has a dc output 79 and a square wave output 80. Toner conveyor 48 is separated from donor roll 41 by a gap 50 of around 0.2 mm. During loading the pedestal driver voltage is set at ground 75; positive voltage 76 is a write pulse applied during a write cycle and will be further discussed in that context. During operation, a fresh monolayer of charged toner rotates into position opposite refresh segment 48. When excitation voltage 80 is turned on, the amplitude of the square wave is sufficient to oscillate particles in the gap 50, such that they strike the surface of refresh segment 48 before returning to the donor roll. In FIG. 6, $\Phi 1$ of the three phase clock is active; i.e. $\Phi 1$ electrodes are attracting and $\Phi 2$ and $\Phi 3$ electrodes are repelling toner particles. Consequently, particles that touch $\Phi 1$ electrodes adhere to the electrodes, and particles that touch the other electrodes do not adhere. Once an active electrode is covered with a toner particle, it is screened by the particle charge and does not attract additional toner particles. The motion of toner particles in the gap 50 during excitation is somewhat chaotic; however, over time the desired loading of the refresh segment is accomplished, and toner on loaded electrodes can be stepped toward the imaging region.

Figure 7:
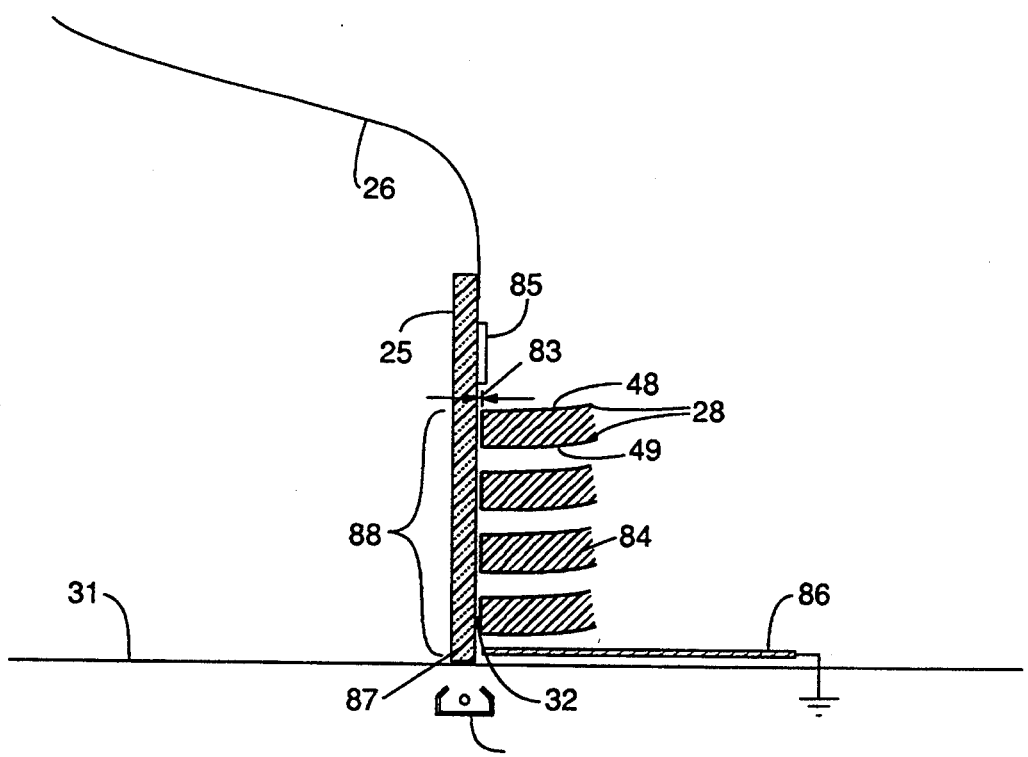
FIG. 7 is a cross-sectional view showing the writing head in relation to the toner conveyors and the receiving sheet.

FIG. 7 shows writing head 25 in relation to receiving sheet 31, corona charging device 14, and toner conveyors 28 including refresh segments 48 and return segments 49. Areas of close proximity between conveyors 28 and writing head 25 are shown as imaging regions 32. The associated gap 83 is approximately 0.2 mm in the preferred embodiment. An insulating material 84 supports each of the conveyors 28. Also shown are an IC 85 which will be further described, and a grounded shield 86 to protect the receiving sheet from stray toner particles. Writing head 25 is manufactured on an insulating substrate 87 such as glass. The writing head area facing toner conveyors 28 defines imaging array 88.

Figure 8:
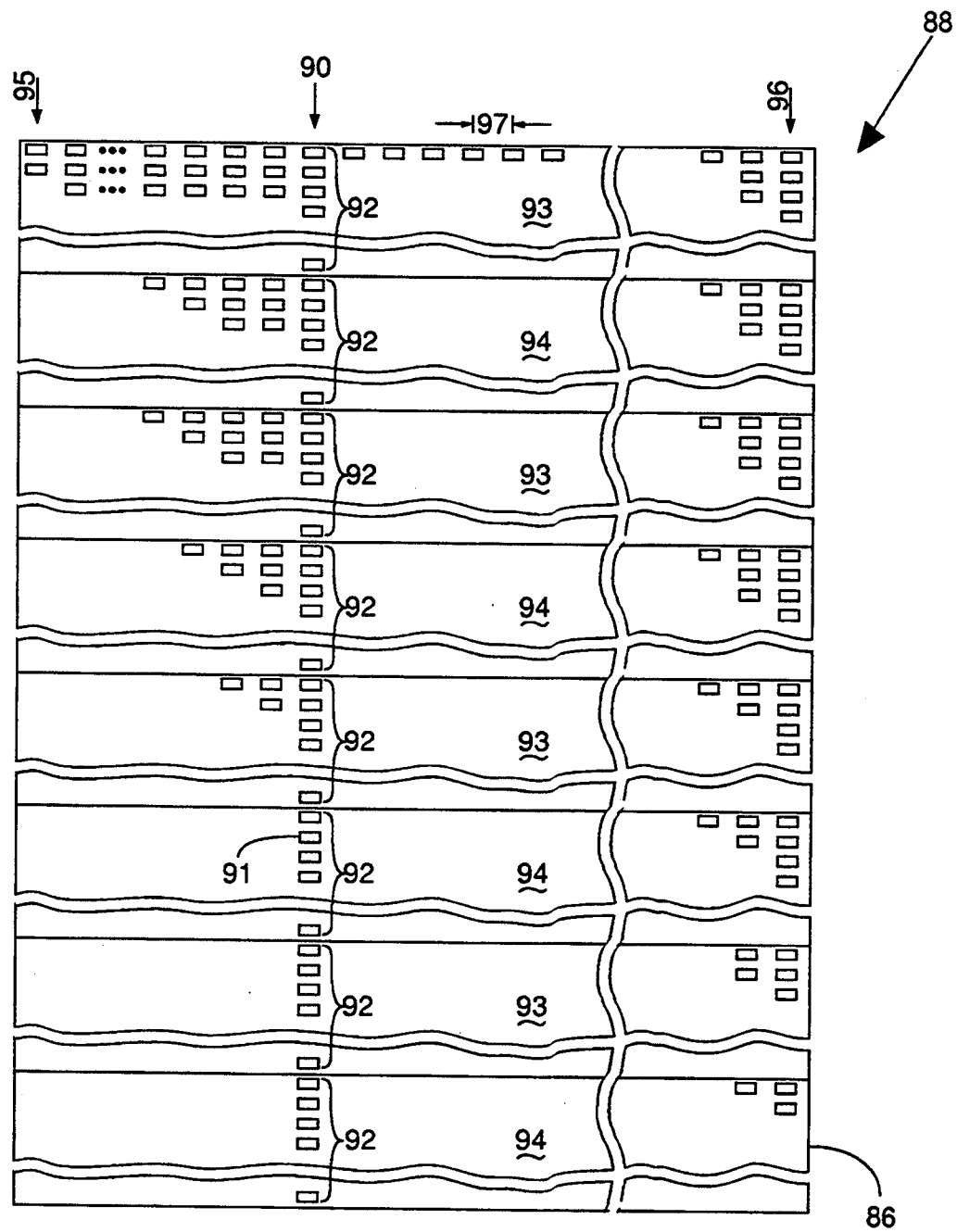
FIG. 8 is a schematic view of portions of a four color imaging array of the present invention.

A schematic description of imaging array 88 built on glass substrate 86 is shown in FIG. 8. Columns 90 of write electrodes 91 are provided for each pixel site to be printed. Each column 90 comprises a linear array of electrodes in 8 equal sections 92. The sections are defined as imaging sections 93 in imaging regions wherein a toner conveyor and the writing head are in close proximity, or non imaging sections 94 in the spaces between imaging regions. Each section 92 comprises 189 electrodes to support 24 bit color. Six bits assigned to each of 4 colors decodes into a requirement for 0 to 63 electrodes to be selectively conditioned within each imaging section 93. Since only every third electrode can be active, $3 \times 63 = 189$ electrodes are required per section. The non imaging sections 94 have the same number of electrodes as the imaging sections in the preferred embodiment. This provides space to align conveyors 28 with imaging sections 93, while avoiding interactions between conveyors. The column corresponding to the first pixel position on the page is labelled 95, and the 2400th electrode corresponding to the last pixel position on the page is labelled 96. Eight inches times 300 pixels per inch results in 2400 pixels across the page in the preferred embodiment, and the corresponding electrode pitch in the transverse direction 97 is $85\mu$.

Figure 9:
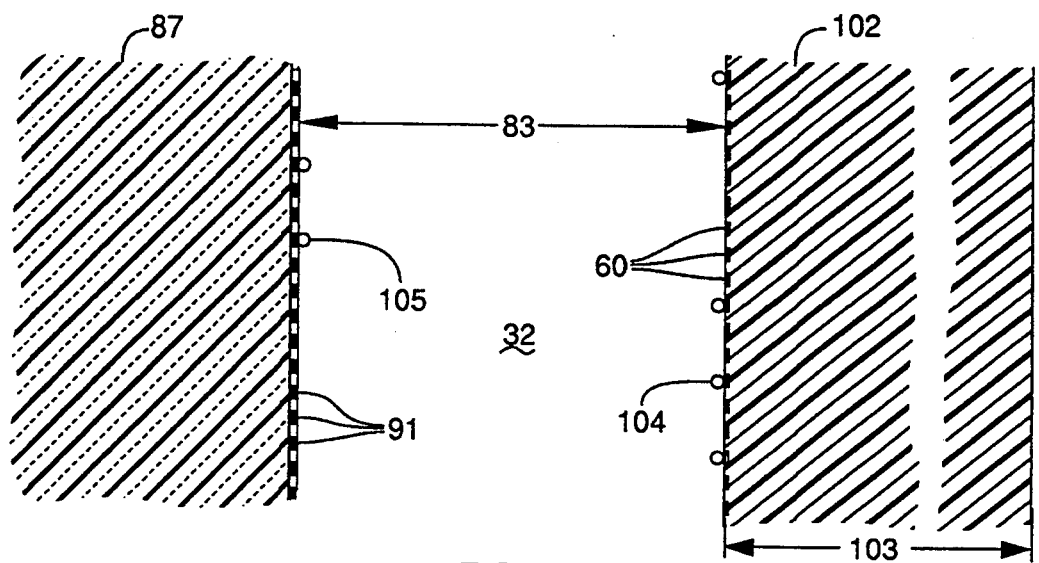
FIG. 9 is an enlarged fragmentary cross-sectional view of an imaging region between a toner conveyor and an imaging array.

Toner imaging will now be described. A portion of imaging region 32 of FIG. 7 is expanded in FIG. 9 to show the details of elongated toner conveyor electrodes 60, writing head electrodes 91, and image transfer gap 83 in between. Toner conveyor substrate 102 is a flexible polyimide material with a thickness 103 of approximately 2 mm, bonded to insulating material 84. Writing head substrate 87 is glass with a thickness of a few millimeters. Image transfer gap 83 is 0.2 mm. First, write electrodes 91 within imaging array 88 are selectively conditioned or sensitized to be active so as to attract toner, as will be further described in relation to the write head electronic circuits. Then, on application of a write pulse 76, toner particles traverse gap 83 between toner conveyor and writing head, and adhere to conditioned electrodes within the imaging array. Similarly to the three phase clock of the toner conveyors, at most every third electrode on the writing head can be active. This is a necessary condition to create voltage travelling waves that are effective in transporting the toner. The electrode spacing on the imaging array is preferably $5\mu$, again to provide maximum field strength without air breakdown. The purpose of a write cycle is to transfer toner from toner conveyors 28 to image loading regions 93 of imaging array 88 in expanded image configuration. Writing head electrodes 91 are conditioned in accordance with the desired number of packets of toner of each color required for each pixel site. After conditioning of electrodes 91 the three phase toner conveyor clocks are stopped with one phase active, effectively holding fresh toner available in the imaging regions 32. Also excitation voltage 88 is switched off to momentarily suspend loading of the toner conveyors. Then positive pedestal voltage 76 is applied to the toner conveyor electrodes to repel a wave of toner particles toward writing head 25. Voltage 76 shall be called the write pulse. When toner particles strike imaging array 88 in toner loading regions 93, they adhere to conditioned electrodes but do not adhere to unconditioned electrodes. Then the write pulse is turned off by returning pedestal voltage 76 to ground 83, and particles not adhering to conditioned electrodes on the writing head are returned to elongated electrodes on the toner conveyors. Then excitation voltage 88 is turned back on, and stepping of the toner conveyors is resumed to load fresh toner alongside imaging regions 32, ready for the next imaging cycle. In FIG. 9, some toner conveyor particles such as 104 have been written during a write cycle to conditioned writing head electrodes, e.g. 105. By this means, toner particles have been transferred to the writing head in expanded image configuration. The expanded image will be collapsed into a final pixel image by stepping all the toner packets to the transfer edge of the writing head, and from the transfer edge to the paper. All the packets for a single pixel are then superimposed at the pixel site.

Figure 10:
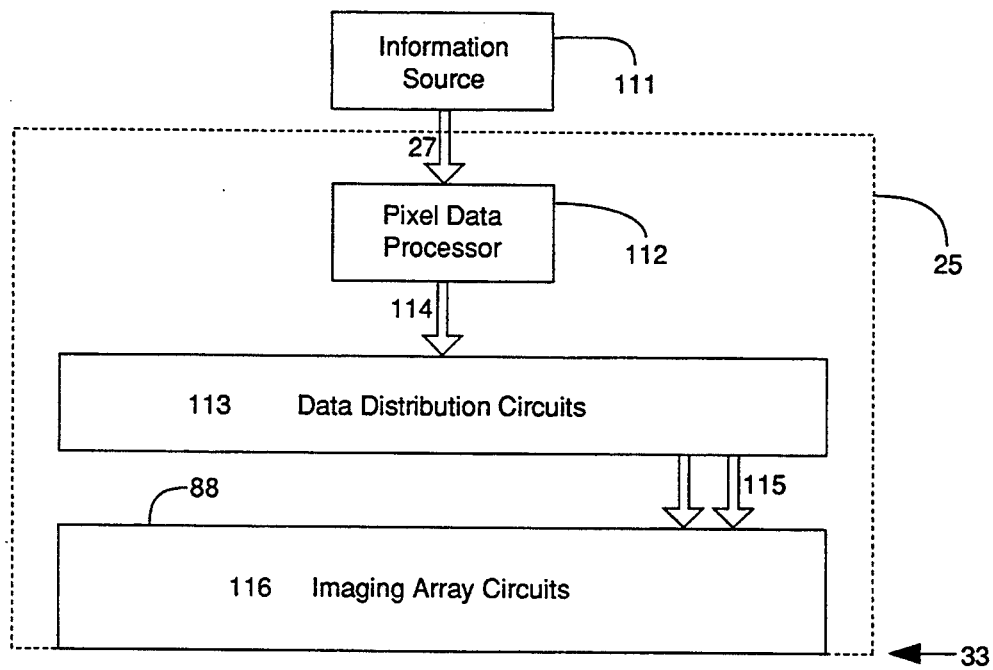
FIG. 10 is a data flow diagram for the writing head.

The structure and operation of the writing head 25 will now be examined. FIG. 10 shows the flow of data within the writing head, culminating in a flow of toner packets to a transfer edge 33 of the writing head. An information source 111 provides print and control data 27 to a pixel data processor 112 on writing head 25. In the preferred embodiment, print data takes the form of raster data, with one 24 bit word describing each pixel location to be printed; six bits required for a pixel depth range of 0-63 for each color. Control data includes end-of-line (EOL) characters to terminate pixel lines. Data and control information 27 are provided by the system controller board. Each pixel site on the receiving sheet is supported by a digital processor that computes bit patterns specific to that pixel. Rather than replicating the pixel data processor many times to provide enough output pins to drive every pixel, it is economic to provide data distribution circuits 113 that collect high speed outputs 114 from pixel data processor 112 and distribute them by multiplexing or other means to provide data and clocks, 115, to define conditioned write electrodes in imaging array 88. Imaging array 88 contains all the write electrodes for imaging a pixel line across the full width of the page simultaneously and includes imaging array circuits 116. Imaging array circuits 116 include a memory element for each write electrode. The memory element stores a 0 or a 1 so as to define the electrode as conditioned or unconditioned, respectively. A combination of ICs and TFTs can be used to most economically implement all the functions of 112, 113, and 116. To implement the circuit function 116 several data structures are possible, including a single random access memory, or a linear store comprised of multiple shift registers. The preferred embodiment of the present invention uses ICs for the pixel data processor 112 and TFTs for the distribution circuits 113 and the imaging array circuits 116. Further, the imaging array is implemented with one static shift register for each pixel site and one bit of shift register for each write electrode in the preferred embodiment, i.e. a static shift register is provided for each column 90 of imaging array 88. Depending on the voltage capability of ICs and TFTs, level shifters may be required to achieve the desired operating voltage at the write electrodes. In the preferred embodiment, accelerating rectangular waveforms as described in FIG. 5C are used to clock the shift registers to provide adequate printing speed without increasing the voltage requirement above 20 volts for the TFTs.

Figure 11:
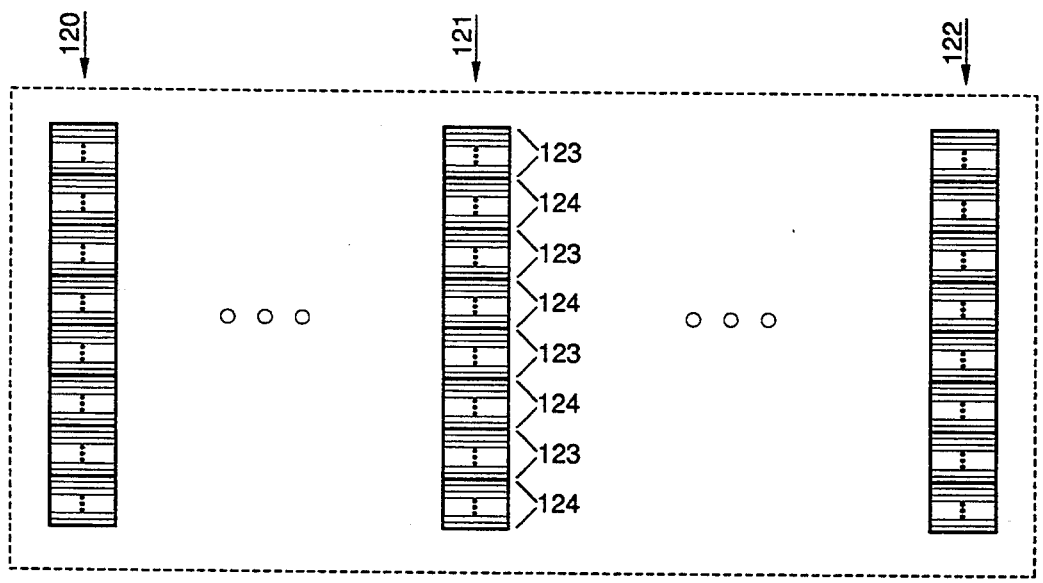
FIG. 11 is a schematic view of imaging array circuits on a writing head.
Figure 12:
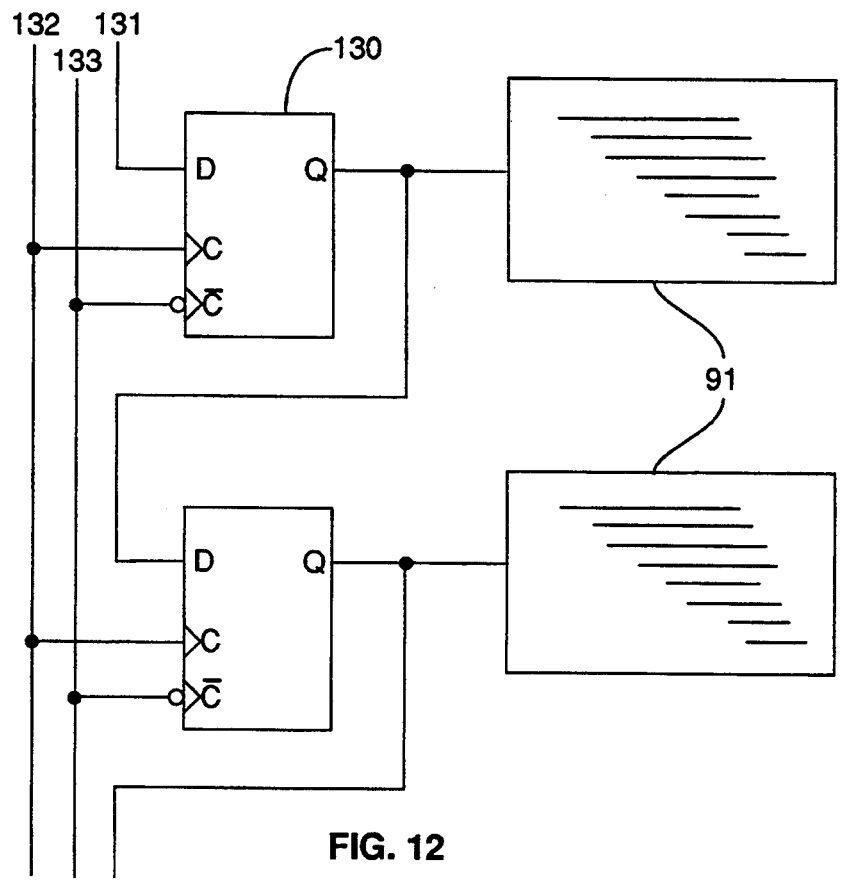
FIG. 12 shows the shift register logic associated with write electrodes in an imaging array.

Further description of imaging array circuits 116 is provided in FIGS. 11 and 12. FIG. 11 is a schematic showing a shift register 120 provided for column 1, shift register 121 provided for arbitrary column n, and shift register 122 provided for column 2400 in the preferred embodiment. Each shift register is logically partitioned into sections 123 that support image loading and sections 124 that provide continuity and spacing between sections 123. Sections 123 and 124 correspond to sections 93 and 94 of FIG. 8, respectively. Each section includes 3×63=189 bits of shift register, for a total of 1512 bits per shift register in the eight sections shown. Shift register bits in the image loading section 123 have 0's wherever an active electrode is required, and 1's elsewhere. All the register bits in section 124 are filled with 1's during loading, so they are not active and will not attract toner.

The logic associated with each write electrode 91 of a shift register section such as 123 is described in FIG. 12. One bit of static shift register 130 is provided for each write electrode 91. Inputs to each shift register bit include data 131, clock 132, and inverted clock 133. The Q output of each bit connects to a write electrode and to the data input of the next bit. The shift register is implemented in static logic so that the data will be retained during a write cycle while no shifting is occurring.

Figure 13:
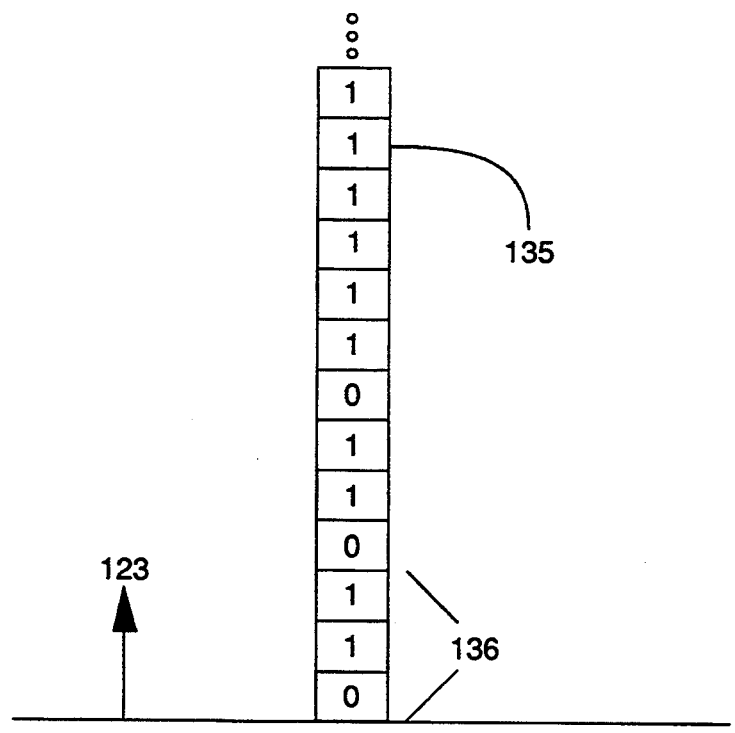
FIG. 13 shows a binary shift register pattern for a pixel depth of 3.

A representative binary pattern programmed into a shift register is shown in FIG. 13. For example, suppose that this register 135 corresponds to pixel site number 100 on the receiving sheet, and this section 123 of the register contains the bits required for imaging cyan. Suppose that the pixel depth required for cyan at pixel site 100 is 3 out of a possible 63. Then there will be a requirement for exactly 3 of the 189 shift register bits in this section to be programmed to 0's during a write cycle. A group of three bits in the register, with at most one bit a zero corresponding to an active or conditioned electrode, shall be defined as a set indicated as 136. In section 123 there are 63 sets, comprising a total of 189 shift register bits. The pixel data processor 112 will separate the 6 bits for cyan from the 24 bit word for pixel 100 and read the value 3 for pixel depth. The pixel data processor will then activate clock and data lines which will be connected by distribution circuits 113 to shift register 135 in column 100 so as to input the pattern shown in this portion of the register. After the entire shift register has been serially loaded with similar patterns for each color, spaced by bits which are all 1's, a write pulse will cause conditioned electrodes to receive toner packets from all colors simultaneously. After completion of the write cycle all registers will be clocked 1512 times to shift (step) all the packets written to conditioned electrodes off the transfer edge of the writing head, where they will be received by corresponding pixel sites on the receiving sheet. Then the system controller will step the paper and the process will be repeated for the next pixel line.

Figure 14:
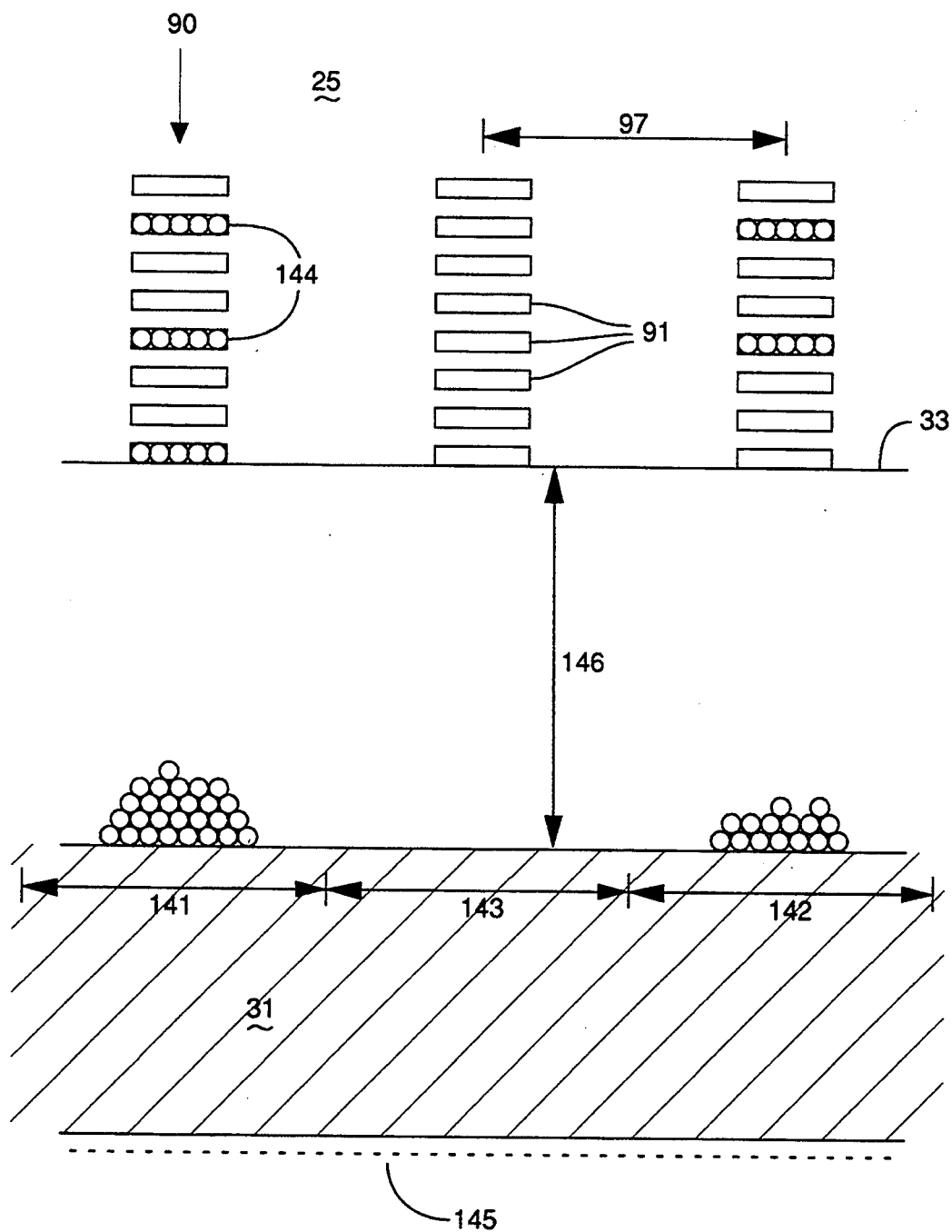
FIG. 14 shows an enlarged cross-sectional view of the transfer edge of the writing head in relation to the receiving sheet during toner transfer.

Transfer of the image to the receiving sheet will now be described. A magnified side view of writing head 25 with transfer edge 33 positioned opposite receiving sheet 31 is shown in FIG. 14. Write electrodes 91 are arrayed in columns 90 perpendicular to the receiving sheet. Transverse pitch 97 between write electrodes is 85$\mu$ corresponding to a pixel resolution of 300 per inch. Columns corresponding to pixel sites 141 and 142 have conditioned electrodes, but the array corresponding to pixel site 143 has no conditioned electrodes. Toner packets 144 are adhering to conditioned electrodes. In the preferred embodiment, the number of toner particles in a toner packet is typically 5, and the quantity of toner colorant is adjusted so that this sized packet represents one 63rd of the amount of color required to saturate a pixel site in that color. Transfer charge 145 creates a constant attracting field for toner particles, independent of transfer gap 146 for moderate sized gaps of the order of 0.5 mm or less. However, if the gap is too large, particles within a toner packet may diverge due to mutual repulsion while traversing the gap. In the preferred embodiment gap 146 has a nominal value of 0.1 mm. As shown in FIG. 14, piles of toner build up at pixel sites according to the number of packets programmed for each pixel site. The toner particles are translucent, and colors can be layered in any order to achieve the desired composite color at each pixel site.

Figure 15A:
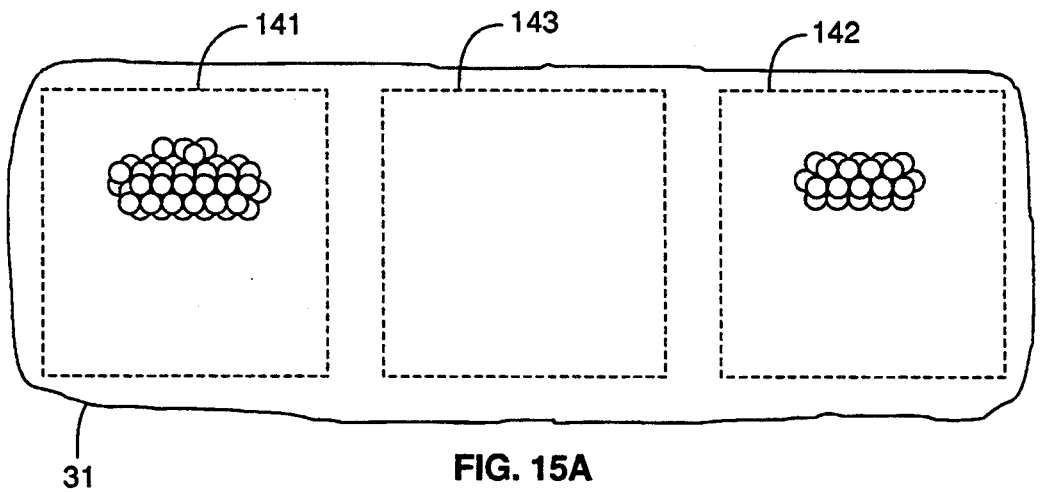
FIG. 15A is an enlarged plan view of toner particles on pixel sites, prior to fixing.
Figure 15B:
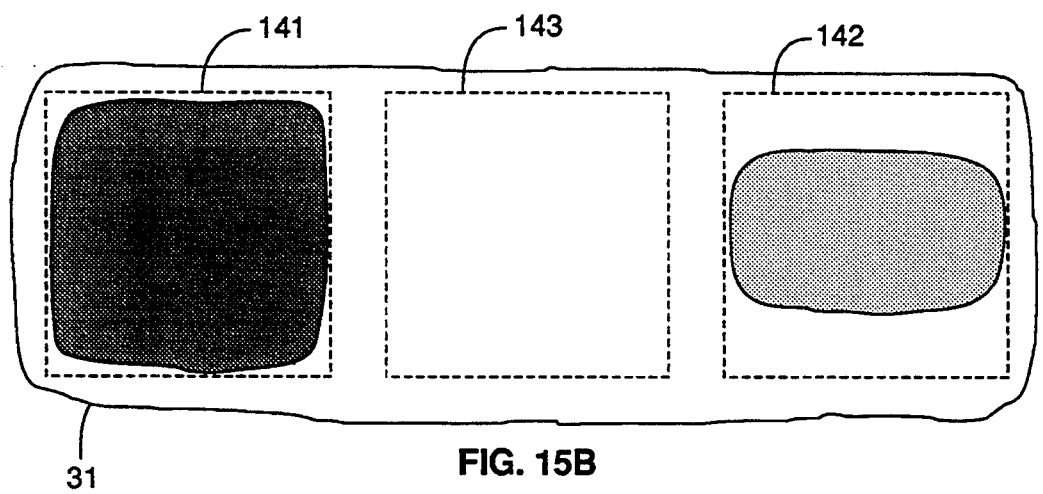
FIG. 15B is an enlarged plan view of the pixel sites of FIG. 14A after fixing, showing three levels of pixel depth (gray scale).

FIG. 15A shows a plan view of the toner piles shown in FIG. 14, as transferred and prior to fixing. Pixel site 141 has a medium pile of particles, site 142 has a small pile, and site 143 has no toner particles. FIG. 15B shows the same pixel sites after passing through the fusing rollers of fixing assembly 17. The combination of heat and pressure applied by the fusing rollers flattens the transferred toner packets into smooth surfaced deposits that are permanently affixed to the receiving sheet, as is known in the art. Pixel site 141 is dark, site 142 is lighter, and site 143 is white, in accordance with the amount of toner received.

Figure 16:
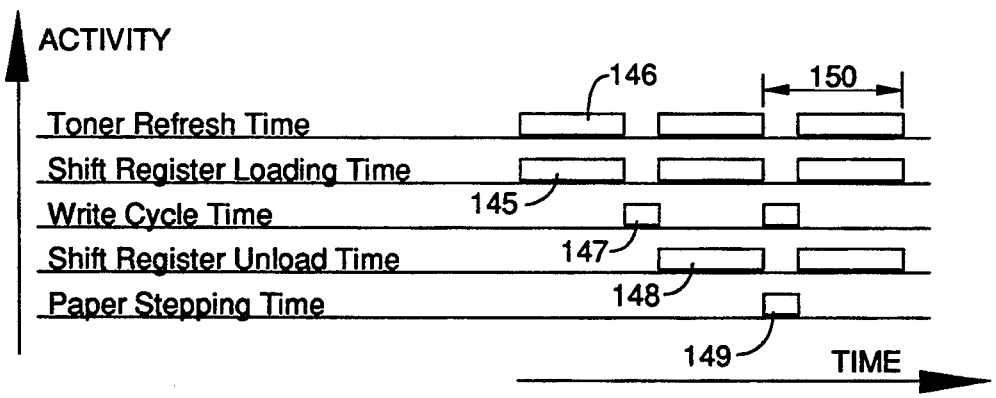
FIG. 16 shows a timeline for the print algorithm of the present invention.

A timeline that shows system timing for printing a pixel line is shown in FIG. 16. The most critical timing parameter that determines print speed is the clock rate of the shift registers, at the chosen output amplitude. Toner packets can be moved at clock rates exceeding 1 MHz using the rolling model if accelerating waveforms are used, and if the drive transistors can provide the necessary current. For example, if the write electrodes have a capacitance of 0.2 pF, a peak current of approximately 20 µA is required to achieve a risetime of 0.2 µs to an amplitude of 20 V. FIG. 16 assumes a shift register clock rate of 1 MHz resulting in a loading time 145 for 1512 bits of shift register of approximately 1.5 ms. Toner refresh time 146, wherein the toner conveyors step new toner into the imaging regions, can occur simultaneously with shift register loading, because the toner conveyor and the writing head are not electrically coupled when the write pulse is inactive. A write cycle 147 can perform the parallel load of all the active write electrodes in less than 0.5 ms. Since the ratio of toner refresh time to write cycle time is 3, and since the write electrodes 91 have gaps between them that the elongated conveyor electrodes 60 do not have, the clock rate on the toner conveyors can be approximately 10 times slower than the average shift register clock rate. A further 1512 shift register clocks are required to step the imaged toner to the receiving sheet for a shift register unload time indicated as 148 of approximately 1.5 ms. Finally the paper stepping time 149 is assumed to be 0.5 ms. While the paper is not moving, loading and unloading of the shift registers can occur simultaneously, using the same 1512 clocks for both. Also write cycle 147 can occur concurrently with stepping the paper. Taking these concurrencies into account, a pixel line can be imaged in approximately 2 ms in the preferred embodiment. Assuming that the image length on a page is 10 inches, 3000 pixel lines per page are required at a resolution of 300 dots per inch. This results in an approximate print time per page of 6 seconds, or a printing rate of 10 pages per minute. The presence of white space on a page and the use of EOL characters can improve the average throughput rate beyond 10 ppm. This speed is achieved while producing a continuous tone image; i.e while providing 24 bit color at every pixel location in the preferred embodiment. It is apparent that the print engine can selectively print either black and white or color, or interspersed color and black and white images on a single sheet.

Figure 17:
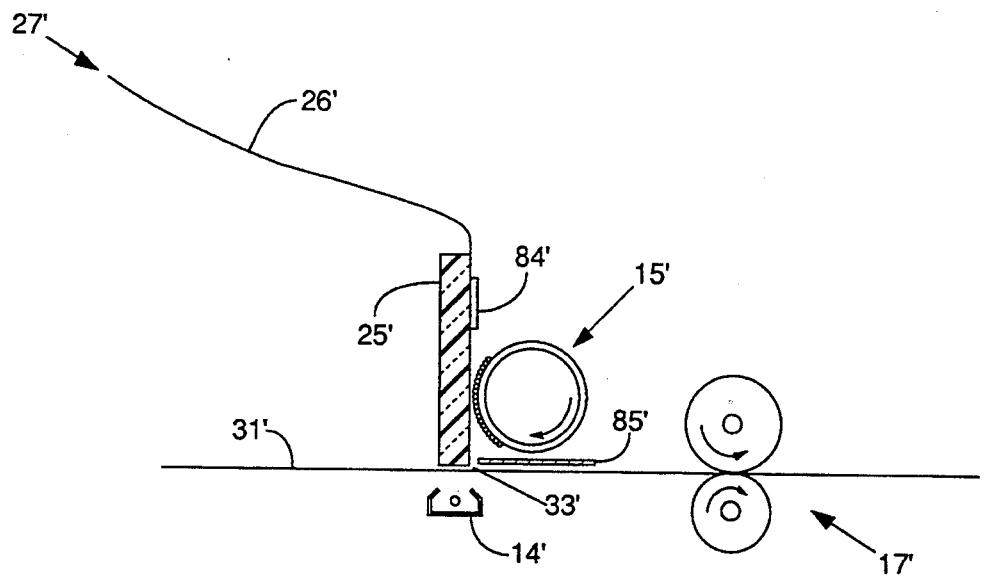
FIG. 17 shows a schematic side view of a monochrome print engine of the present invention.
Figure 18:
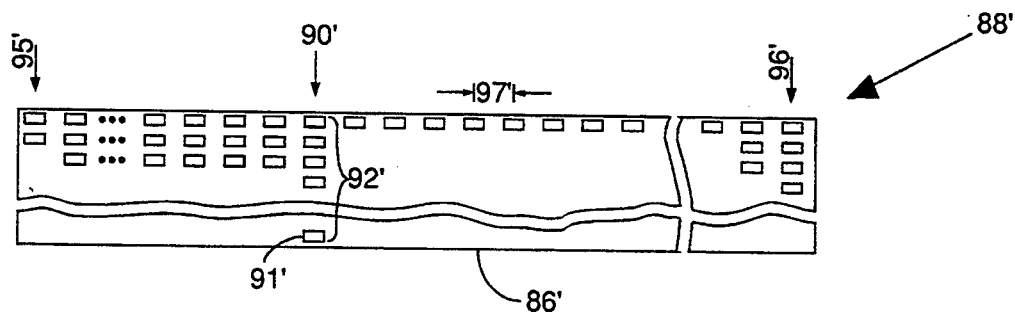
FIG. 18 is a schematic view of portions of a simplified imaging array for use with the monochrome engine of FIG. 17.

A second embodiment comprising a simple apparatus for high speed printing of monochrome images with an arbitrary number of gray scale levels is shown in FIG. 17. Data and control information 27′ are fed via ribbon cable 26′ to a writing head 25′ which includes one or more ICs 84′. A source of charged toner particles 15′ provides toner at the surface of writing head 25′. Grounded shield 86′, corona charging device 14′, and fixing assembly 17′ are similar to those described in the first embodiment. Also, writing head 25′ has a transfer edge 33′ in close relation to receiving sheet 31′. Writing head 25′ also includes an imaging array 88′ which is further described in FIG. 18. Imaging array 88′ is built on glass substrate 86′ and includes a single section 92′ comprised of 159 electrodes. The number of electrodes is chosen at 159 to match a toner source donor roll diameter of 0.5 inches. Twenty four hundred columns such as 90′ are provided in the second embodiment to cover 8 inches at 300 dots per inch; the first column is labeled 95′ and the 2400th column is labelled 96′. The transverse pitch between write electrodes 97′ is 85µ. In operation, an excitation voltage such as the square wave 80 of the first embodiment is continuously applied to the toner source donor roll, to provide a continuous supply of agitated black toner particles adjacent imaging array 88′ of writing head 25′. The print algorithm consists of shifting 1's and 0's into shift register elements associated with write electrodes as in the first embodiment, between each stepping of the paper. The number of 0's will determine the gray scale level, as before. As each 0 in the register steps by the toner source, the associated write electrode will pull off a packet of toner and then the column of shift register bits and associated electrodes will convey the packet to the transfer edge, and from the transfer edge to the paper using the same transfer process as in the first embodiment.

It should be apparent by the teaching of the invention that digital algorithms have broad applicability to marking engines in the form of digital algorithms applied to discrete toner packets. Preferred embodiments have been described for a single pass color printing engine and monochrome printing engine, each employing a single writing head. The image creation process is driven electronically with no moving parts which creates potential for high speed, low cost, and high reliability. The number of pixel depth levels in either embodiment can be adjusted by programming a different number of packets and adjusting the quantity of toner colorant in the particles. Alternatively, the size of the write electrodes can be changed to adjust the number of toner particles in a toner packet. For high speed machines the print engines can be adapted to continuous paper motion rather than stepped. Many other embodiments will be apparent to practitioners skilled in the art.

What is claimed is:

1. A printer for printing pixels on an image receiving member comprising:
   a toner particle source;
   an image writing head including at least one column including a plurality of in-line sets of spaced electrodes terminating in a transfer edge;
   means for electrically conditioning one of the electrodes of selected sets to store an amount of toner whereby a predetermined amount of toner from none to an amount which can be stored by conditioning an electrode in all of said sets is stored in said column;
   means for transferring toner from said particle source to said conditioned ones of said electrodes;
   means for bringing said image receiving member into cooperative relationship with the transfer edge of said image writing head;
   means for applying stepping voltages to said electrodes to cause said toner to be conveyed along said column to the transfer edge of said writing head; and
   means for transferring toner from the transfer edge of said head to said image receiving member to form a pixel having said predetermined amount of toner.

2. A printer as in claim 1 in which said electrodes are each connected to a memory element for conditioning and conveying.

3. A printer as in claim 2 in which said memory elements comprise a shift register bit.

4. A printer as in claim 1 in which said means for transferring toner from said toner source to said electrodes includes a toner conveyor.

5. A printer as in claim 4 including means for transferring toner from said source to said conveyor and from said conveyor to said head.

6. A printer as in claim 1 in which the image receiving member and the writing head are moved relative to one another to accomplish printing of a two dimensional image.

7. A printer as in claim 1 including means to fix said image on said image receiving member.

8. A printer as in claim 1 in which the means for transferring toner from the transfer edge of the head to the image receiving member comprises means for charging the underside of the receiving member.

9. A printer for printing pixels on an image receiving member comprising:
- a toner particle source;
- an image writing head including a plurality of side by side columns each including a plurality of in-line sets of spaced electrodes terminating in a transfer edge;
- means for electrically conditioning one of the electrodes of selected sets in each column to store an amount of toner whereby a predetermined amount of toner from none to an amount which can be stored by conditioning an electrode in all of said sets is stored in each column;
- means for transferring toner from said particle source to said conditioned ones of said electrodes in each column;
- means for bringing said image receiving member into cooperative relationship with the transfer edge of said image writing head;
- means for applying stepping voltages to said electrodes to cause said toner to be conveyed along said columns to the transfer edge of said writing head; and
- means for transferring toner from the transfer edge of said head to said image receiving member to form a line of pixels each having said predetermined amount of toner.

10. A printer as in claim 9 in which said electrodes are each connected to a memory element for conditioning and conveying.

11. A printer as in claim 10 in which said memory elements comprise a shift register bit.

12. A printer as in claim 9 in which the image receiving member and the writing head are moved relative to one another to accomplish printing of a two dimensional image.

13. A printer as in claim 9 including means to fix said image on said image receiving member.

14. A printer as in claim 9 in which the means for transferring toner from the transfer edge of the head to the image receiving member comprises means for charging the underside of the receiving member.

15. A printer as in claim 9 in which said means for transferring toner from said toner source to said electrodes includes a toner conveyor.

16. A printer as in claim 15 including means for transferring toner from said source to said conveyor and from said conveyor to said head.

17. A printer for printing pixels on an image receiving member comprising:
- toner particle sources, one for each toner color;
- an image writing head including a plurality of columns, each column including a plurality of in-line sets of spaced electrodes arranged in sections, including a section for each color, terminating in a transfer edge;
- means for electrically conditioning one of the electrodes of selected sets in each section to store an amount of toner whereby a predetermined amount of toner from one of said sources, from none to an amount which can be stored by conditioning an electrode in all of said sets in each section, is stored in a corresponding section in each column;
- means for transferring toner from said particle sources to said conditioned ones of said electrodes in a corresponding section;
- means for bringing said image receiving member into cooperative relationship with the transfer edge of said image writing head;
- means for applying stepping voltages to said electrodes to cause said toner to be conveyed along said column to the transfer edge of said writing head; and
- means for transferring toner from the transfer edge of said head to said image receiving member to form a pixel having said predetermined amount of toner of each color.

18. A printer as in claim 17 in which said electrodes are each connected to a memory element for conditioning and conveying.

19. A printer as in claim 18 in which said memory elements comprise a shift register bit.

20. A printer as in claim 17 in which said means for transferring toner from said toner source to said electrodes includes a toner conveyor.

21. A printer as in claim 20 including means for transferring toner from said source to said conveyor and from said conveyor to said head.

22. A printer as in claim 17 in which the image receiving member and the writing head are moved relative to one another to accomplish printing of a two dimensional image.

23. A printer as in claim 17 including means to fix said image on said image receiving member.

24. A printer as in claim 17 in which the means for transferring toner from the transfer edge of the head to the image receiving member comprises means for charging the underside of the receiving member.

25. A method of applying toner to an image receiving member to form a line of pixels each having a predetermined amount of toner which comprises the steps of:
- conditioning a printhead having a plurality of side by side columns of spaced electrodes so that a selected number of electrodes in each column can each hold an amount of toner;
- applying toner to said selected electrodes;
- positioning said image receiving member adjacent a transfer edge of said head;
- conveying the toner along said columns to said transfer edge; and
- causing said conveyed toner to transfer to said image receiving member to form a pixel for each of said columns, each pixel having said predetermined amount of toner.

26. The method of printing as in claim 25 in which the toner is applied by conveying the toner to the print head.

27. The method of printing as in claim 26 including the step of providing relative movement between the image receiving member and the writing head to print a two dimensional image.

28. A method of applying toner to an image receiving member to form a line of pixels each having a predetermined amount of toner which comprises the steps of:
- conditioning a printhead having a plurality of side by side columns of spaced electrodes, each column having a plurality of sections, so that a selected number of electrodes in each section can each hold an amount of toner;

applying toner of different colors to said selected electrodes in corresponding sections;

positioning said image receiving member adjacent a transfer edge of said head;

conveying the toner along said columns to said transfer edge; and causing said conveyed toner to transfer to said image receiving member to form a pixel for each of said columns, each pixel having said predetermined amount of toner.

29. The method of printing as in claim 25 in which the toner is applied by conveying the toner to the print head.

30. The method of printing as in claim 26 including the step of providing relative movement between the image receiving member and the writing head to print a two dimensional image.

* * * * *